United States Patent [19]

Bullman

[11] 4,340,524
[45] Jul. 20, 1982

[54] WATER-RESISTANT LATEX SEALANTS

[75] Inventor: Allan R. Bullman, Bernardsville, N.J.

[73] Assignee: Union Carbide Corporation, Danbury, Conn.

[21] Appl. No.: 163,955

[22] Filed: Jun. 30, 1980

[51] Int. Cl.³ .............................................. C08L 33/08
[52] U.S. Cl. ..................................... 524/297; 428/411;
428/438; 428/441; 428/442; 428/461; 428/463;
524/503; 524/506; 524/510; 524/517; 524/521;
524/522; 524/524; 524/527
[58] Field of Search ............... 260/29.6 RB, 29.6 NR, 260/29.6 N, 29.6 MN

[56] References Cited

U.S. PATENT DOCUMENTS

| | | | |
|---|---|---|---|
| 3,088,847 | 5/1963 | Pines | 117/75 |
| 3,240,741 | 3/1966 | Campbell | 260/29.7 |
| 3,813,351 | 5/1974 | Lewiston | 260/2 EP |
| 3,865,768 | 2/1975 | Mohr | 260/23 AR |
| 3,882,068 | 5/1975 | Swartz | 260/29.6 |
| 3,904,805 | 9/1975 | Johnson et al. | 428/378 |
| 3,959,533 | 5/1976 | Kitaj | 427/386 |
| 3,988,496 | 10/1976 | Biggs et al. | 428/383 |
| 3,998,985 | 12/1976 | Kitaj | 427/386 |
| 4,122,074 | 10/1978 | Pepe et al. | 526/26 |
| 4,125,673 | 11/1978 | Roth et al. | 428/447 |
| 4,128,675 | 12/1978 | Rössler et al. | 427/390 |
| 4,137,208 | 1/1979 | Elliott | 260/29.6 RB |
| 4,148,944 | 4/1979 | Ruhf | 260/29.6 RB |
| 4,160,750 | 7/1979 | Columbus et al. | 260/17.4 ST |
| 4,178,412 | 12/1979 | Sage et al. | 428/391 |
| 4,206,105 | 6/1980 | Stafford | 260/29.6 RB |
| 4,210,712 | 7/1980 | Munger et al. | 260/29.6 RB |

Primary Examiner—John Kight, III
Assistant Examiner—Amelia B. Yarbrough
Attorney, Agent, or Firm—Bernard Francis Crowe

[57] ABSTRACT

Acrylic latex sealants are rendered water-resistant and have improved wet adhesion to a variety of substrates by incorporating hydrophobic resins and an aminosilane hydrolyzate therein.

14 Claims, No Drawings

WATER-RESISTANT LATEX SEALANTS

BACKGROUND OF THE INVENTION

This invention relates to acrylic latex sealants containing hydrophobic resins and more particularly to those containing an aminosilane hydrolyzate and a vinyl, acrylic or phenoxy resin.

Acrylic latex based sealants exhibit many desirable properties, such as, good flexibility, good adhesion to many substrates and resistance to degradation by ultraviolet radiation. They suffer from one or more fatal weaknesses, unfortunately, viz., poor wet adhesion and lack of water resistance. Intermittent wetting of acrylic latex based sealants after they have cured is not a problem. However, if the acrylic latex based sealants are immersed in water for continuous periods of time, that is, 24 hours or longer, total loss of adhesion can occur. Furthermore, these sealants under such conditions begin to soften and lose integrity due to the lack of water resistance.

Latex sealants which have only cured for several hours exhibit greater sensitivity to water and lose dimensional stability.

It is therefore an object of this invention to provide an acrylic latex based sealant which will exhibit good water resistance on short time curing.

It is another object of this invention to provide an acrylic latex based sealant which will withstand immersion in water for prolonged periods without loss of adhesion to substrates or disintegration.

Other objects of this invention will become apparent to those skilled in the art upon a further reading of the specification.

DESCRIPTION OF THE INVENTION

A method of improving the water resistance of acrylic resin latex based sealants has been found which comprises introducing an hydrophobic resin dissolved in a liquid organic non-coagulating, non-gelling solvent into said acrylic latex resin which has been previously treated with an aqueous solution of a hydrolyzed organoaminosilane and a base. This method comprises charging an acrylic latex containing predominantly an alkyl acrylate or methacrylate copolymerized with minor amounts of comonomers, such as, acrylic acid, methacrylic acid, acrylonitrile, itaconic acid, n-methylol acrylamide and the like, where the alkyl groups contain from 1 to about 8 carbons to a mixer followed by charging a mixture of an aqueous solution of an hydrolyzed organoaminosilane, such as, gamma-aminopropyltriethoxysilane

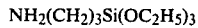

or N-beta(aminoethyl)-gamma-aminopropyltrimethoxysilane

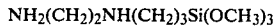

and a base, such as, ammonium hydroxide and agitating until a homogeneous mixture is obtained. To the resultant mass is then added a surfactant, primarily of anionic or non-ionic character, followed by a solution of in a hydrophobic resin in a liquid organic, non-coagulating, non-gelling solvent and finally as optional ingredients a tooling aid, such as, mineral spirits or ethylene glycol, a filler, e.g., calcium carbonate and optionally a biocide, such as, phenol.

The function of the base is to maintain the stability of the hydrolyzed organoaminosilane in the aqueous media by keeping the pH thereof at or above about 8.5. The nature of the base is not critical and so in addition to ammonium hydroxide one may use alkali metal or alkaline earth hydroxides, as for example, sodium hydroxide, potassium hydroxide, lithium hydroxide, calcium hydroxide, barium hydroxide strontium hydroxide and the like as well as alkylamines, such as, monoethylamine, diethylamine, triethylamine and the like; alkanolamines, such as, monoethanolamine, diethanolamine, triethanolamine and the like; quaternary bases, such as, benzyltrimethylammonium hydroxide, and the like.

The amount of base used is not narrowly critical but is usually in the range of about 0.1 to about 2% by weight based on the total composition with a range of about 0.2 to about 1.0% by weight being preferred.

Without wishing to be bound or constricted by a theoretical explanation, it is believed that the unexpected result of obtaining an acrylic based sealant which is hydrophobic is made possible by the imbibition by the acrylic latex particles of the solution of the hydrophobic resin.

The term liquid organic non-coagulating, non-gelling solvent is defined herein to mean conventional plasticizers, such as, dibasic-acid esters as for example, dibutyl phthalate, butyl benzyl phthalate, dioctyl phthalate, dioctyl sebacate, and the like; monobasic acid esters, as for example, diethylene glycol dibenzoate, triethylene glycol dibenzoate, dipropylene glycol dibenzoate, and the like; as well as conventional organic solvents, as for example, glycol ether esters, such as butyl Carbitol acetate (Carbitol is trademark of Union Carbide Corp. for a monalkyl ether of diethylene glycol), 2-ethylhexyl Carbitol acetate, butyl Cellosolve acetate (Cellosolve is a trademark of Union Carbide Corp. for a monoalkyl ether of ethylene glycol), and the like; saturated esters, as for example, 2,2,4-trimethylpentanediol-1,3-monoisobutyrate and the like. These liquid organic non-coagulating, non-gelling solvents contain from about 8 to about 30 carbon atoms.

The amount of liquid organic non-coagulating, non-gelling solvent used in this invention is not narrowly critical but should be sufficient to dissolve the hydrophobic resin. In general the amount will be about 2 to about 20% by weight of the total composition with 3 to about 15% by weight being preferred.

The hydrophobic resin is preferably a vinyl resin, such as, a normally solid vinyl chloride/vinyl acetate copolymer, polystyrene, homopolymers of acrylic of methacrylic acid, copolymers of alkyl acrylates and/or methacrylates as e.g., ethyl acrylate/methyl methacrylate copolymers, or a phenoxy resin derived from the condensation polymerization of epichlorohydrin and bisphenol A, i.e., 2,2'-bis(p-hydroxyphenylpropane. The term vinyl chloride/vinyl acetate copolymer includes not only these two monomeric species, but also terpolymers, such as, vinyl chloride and vinyl acetate copolymerized with maleic acid or anhydride and vinyl alcohol.

The amount of hydrophobic resin used in this invention can range from about 0.1 to about 10% by weight based on the total composition. A preferred amount is about 0.3 to about 5% by weight.

Preferred water insoluble resins are vinyl chloride/vinyl acetate copolymers containing about 3 to about 38% by weight of vinyl acetate copolymerized therein and have an inherent viscosity when measured in cyclohexane at 30° C. in conformity with ASTM 1243 Procedure A of about 0.28 to about 1.5.

Preferred phenoxy resins are thermoplastic polyhydroxyethers which are substantially linear polymers having the general formula:

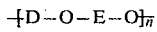

wherein D is the radical residuum of a dihydric phenol, E is an hydroxyl containing radical residuum of an epoxide and n represents the degree of polymerization and is at least 30 and is preferably 80 or more. The term "thermoplastic polyhydroxyether" is intended to include mixtures of at least two thermoplastic polyhydroxyethers.

The thermoplastic poly(hydroxyethers) have reduced viscosities of at least 0.43. Reduced viscosity values were computed by use of the equation:

Reduced Viscosity = $(t_s - t_o)/ct_o$ wherein $t_o$ is the efflux time of the solvent (tetrahydrofuran, $t_s$ is the efflux time of the poly(hydroxyether) solution, c is the concentration of the poly(hydroxyether) solution in terms of grams of poly(hydroxyether) per 100 ml. of tetrahydrofuran.

A preferred polyhydroxyether is derived from 2,2-bis(p-hydroxyphenyl) propane and epichlorohydrin. It is available as Bakelite Phenoxy resin from Union Carbide Corporation and has the following structure:

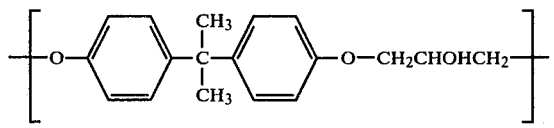

Typical aminoalkylalkoxysilanes which can be hydrolyzed for use in this invention can be represented by the structural formula:

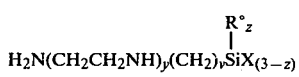

wherein R° represents an alkyl group such as methyl, ethyl, propyl, butyl and the like or an aryl group such as, phenyl, naphthyl, tolyl and the like or an alkaryl such as benzyl and the like. X represents an alkoxy group having 1-8 carbons, such as methoxy, ethoxy, propoxy, 2-ethyl hexoxy, phenoxy, and the like.

y is 0 or 1, v is an integer having values of 1 to 6 and preferably 3, and z is 0, 1 or 2, and preferably 0.

Illustrative of such aminoalkylalkoxysilanes are: aminomethyltriethoxysilane, gamma-aminopropyltriethoxysilane, gamma-aminopropylmethyldiethoxysilane, gamma-aminopropyldiethoxysilane, gamma-aminopropylphenyldiethoxysilane. N-beta(aminoethyl)-gamma-aminopropyltriethoxysilane, delta-aminobutylmethyldiethoxysilane, delta-aminobutylethyldiethoxysilane, delta-aminobutylphenyldiethoxysilane and the like.

The most preferred organoaminosilane is gamma-aminopropyltriethoxysilane (available from Union Carbide Corporation under the Trade designation A-1100) hydrolyzed in an aqueous solution having a 40% solids content. Hydrolyzates of aminosilanes can be prepared by mixing 5 to 50 weight % of the respective aminosilane in water. The alkanol formed during hydrolysis can be partially or completely removed and replaced with water if desired.

The amount of hydrolyzed organoaminosilane used in this invention can range from 0.1 to about 5 weight % of the total composition on a dry basis with about 0.3 to about 1 weight % being preferred.

The nature of non-essential components which can be present in the compositions of this invention is not narrowly critical. Thus, for example, one can use commonly known inorganic fillers, such as, carbonates, oxides, and sulphates. Preferred inorganic fillers include calcium carbonate, calcium oxide, magnesium carbonate and barium sulfate.

One can also use organic fillers, such as, lignin, proteinaceous materials, synthetic fibers, cellulosic materials, and the like.

The amount of fillers can range from 0 to about 80% by weight of the total composition. The preferred amount is about 30 to about 50% by weight.

While no special equipment is needed to make the compositions of this invention, heavy duty mixers are usually employed as for example, a sigma blade mixer, either unjacketed or jacketed for cooling water.

Any anionic or nonionic surfactants can be used to improve the surface active properties of the compositions. Anionic surfactants are preferred, such as, those obtained by alkylating aromatic nuclei, sulfonating the resulting alkylated aromatic hydrocarbons and neutralizing the sulfonation products. Alkyl benzene sulfonates, such as, dodecylbenzenesulfonate are typical of this class. Fatty alcohol sulfates are also useful as surface active agents.

When a surfactant is used, it is preferred to employ about 0.1 to about 5 weight % based on the total composition. Even more preferred is a range of about 0.3 to about 0.7 weight %.

While the compositions of this invention adhere well to both metallic and non-metallic substrates, preferred substrates include vitreous materials, such as, glass; and metals, such as, degreased aluminum, anodized aluminum, cement, wood and the like.

The general method of preparing Examples 1 and 2 entailed charging the acrylic latex to a mixer, such as a Ross Planetary Mixer sold by Charles Ross and Son Co., Hauppauge, Long Island, New York, followed by a premix of aqueous solution of hydrolyzed organoaminosilane and base and agitating until a homogeneous mass was obtained. This was followed by charging an anionic surfactant and a plasticizer solution of a hydrophobic resin. Lastly mineral spirits, or other tooling aids, a freeze thaw stabilizer, such as, ethylene glycol and fillers, such as, calcium carbonate can be added as preferred components. Controls A, B, C and D were prepared by mixing all of the wet ingredients together and then adding all of the dry ingredients.

The invention is further described in the Examples and Controls which follow. All parts and percentages are by weight unless otherwise specified. These are delineated in the Table which follows.

TABLE

| | CONTROL A | CONTROL B | CONTROL C | EXAMPLE 1 | CONTROL D | EXAMPLE 2 |
|---|---|---|---|---|---|---|
| ACRYLIC LATEX A (55%)[a] | 41.5 | 41.0 | 41.0 | 41.0 | 41.0 | — |
| ACRYLIC LATEX B (60%)[b] | | | | | | 37.5 |
| WATER | | | | 0.4 | | 1.5 |
| AMMONIUM HYDROXIDE (29%) | | | | 0.4 | | 0.5 |
| HYDROLYZED SILANE-1[c] | | | | 1.25 | 1.0 | 1.5 |
| SILANE-2[d] | | 0.5 | | | | |
| SILANE-3[e] | | | 0.5 | | | |
| X-405[f] | 0.5 | 0.5 | 0.5 | | 0.5 | |
| AEROSOL OT[g] | | | | 0.5 | | 1.0 |
| SANTICIZER 160[h] | 7.5 | | | | | |
| SANTICIZER 160/VYHD 80/20[j] | | 10.0 | 10.0 | | 10.0 | |
| DBP/VYHD 85/15[k] | | | | 6.7 | | 6.7 |
| ETHYLENE GLYCOL | 1.0 | 1.0 | 1.0 | 1.0 | 1.0 | 1.0 |
| VARSOL #1[l] | 1.5 | 1.5 | 1.5 | 1.5 | 1.5 | |
| CELLOSOLVE[m] | | | | | | 3.0 |
| COMPOSITION T[n] | 0.8 | | | | | |
| R-901[o] | 0.7 | | | 1.0 | | 1.0 |
| CAMELWITE[p] | 46.5 | 45.5 | 45.5 | 46.25 | 45.0 | 46.27 |
| TEKTAMER 38[q] | | | | | | 0.03 |
| FRESHLY MADE SEALANT 7 DAYS ROOM TEMP. AGING (ADHESION) | | | | | | |
| ALUMINUM | EXCELLENT | EXCELLENT | EXCELLENT | EXCELLENT | EXCELLENT | EXCELLENT |
| ANODIZED ALUMINUM | EXCELLENT | EXCELLENT | EXCELLENT | EXCELLENT | EXCELLENT | EXCELLENT |
| GLASS | EXCELLENT | EXCELLENT | EXCELLENT | EXCELLENT | EXCELLENT | EXCELLENT |
| SEALANT AGED IN THE TUBE 14 DAYS THEN APPLIED TO SUBSTRATES, 7 DAYS ROOM TEMP. AGING (ADHESION) | | | | | | |
| ALUMINUM | EXCELLENT | FAIR | POOR | EXCELLENT | GOOD | EXCELLENT |
| ANODIZED ALUMINUM | EXCELLENT | EXCELLENT | EXCELLENT | EXCELLENT | EXCELLENT | EXCELLENT |
| GLASS | EXCELLENT | POOR | POOR | EXCELLENT | FAIR | EXCELLENT |
| SEALANT FRESHLY MADE OR AGED IN THE TUBE UP TO 6 MONTHS THEN APPLIED TO SUBSTRATES, 7 DAYS ROOM TEMP. AGING, THEN IMMERSED IN WATER (ADHESION) | ADHESION AFTER 24 HRS IN $H_2O$ | ADHESION AFTER 24 HRS IN $H_2O$ | ADHESION AFTER 24 HRS IN $H_2O$ | ADHESION AFTER 44 DAYS IN $H_2O$ | ADHESION AFTER 24 HRS IN $H_2O$ | ADHESION AFTER 64 DAYS IN $H_2O$ |
| ALUMINUM | NONE | NONE② | NONE② | EXCELLENT | EXCELLENT | EXCELLENT |
| ANODIZED ALUMINUM | NONE | NONE② | NONE② | EXCELLENT | EXCELLENT | EXCELLENT |
| GLASS | NONE | NONE | NONE | EXCELLENT | POOR | EXCELLENT |

[a] Copolymer of ethyl acrylate containing 4% acrylonitrile, 2% acrylic acid and 1% N-methylol acrylamide copolymerized therein having a Tg = −2° C.; % (total solids, 55% by weight).
[b] Same as Acrylic Latex A but at a total solids content of 60% by weight.
[c] Aqueous solution of hydrolyzed gamma-aminopropyltriethoxysilane containing sufficient $NH_4OH$; pH of 9; % 40%.
[d] Unhydrolyzed gamma - Glycidoxypropyltrimethoxy silane.
[e] Unhydrolyled bis(N,N'-gamma-proplytrimethoxysilyl)ethylene diamine.
[f] Nonionic Surfactant sold by Rohm & Haas.
[g] Dioctyl sodium sulfosuccinate - An anionic surfactant sold by American Cyanamid.
[h] Butyl benzyl phthalate.
[j] Vinyl chloride/vinyl acetate copolymer containing 14% by viscosity of 2% resin in methyl ethyl ketone at 25° C., 23 cps.
[k] DBP - Dibutylphthalate sold by Hatco.
[l] Hydrocarbon solvent from Exxon.
[m] Trademark of Union Carbide for the monomethyl ether of ethylene glycol.
[n] Phosphate type surfactant from Merck.
[o] Titanium dioxide from duPont.
[p] Calcium carbonate from Campbell.
[q] Bactericide sold by Merck.
② If Control B and C were freshly made (less than 1 week old) and drawdowns were made and aged 7 days at room temperature, then immersed in water the adhesion to aluminum would be fair to poor, to anodized aluminum excellent, and no adhesion to glass.

Explanation of the Table

Control A, which is standard commercial high performance acrylic latex sealant exhibits poor wet adhesion when applied to various substrates. It also shows poor wet adhesion and in a simulated rain test also shows poor cohesive strength. After drying at room temperature for 2 hours followed by a 2-hour exposure to the simulated rain test, a sample of Control A drawn down on a glass panel to a thickness of 3/32″ and 1⅜″ wide as a sealant was completely washed off.

Control B is a conventional sealant formulation modified by the addition of 0.5 weight % of unhydrolyzed gamma-glycidoxypropyltrimethoxy silane and 10 weight % of a vinyl chloride/vinyl acetate copolymer in butyl benzyl phthalate (20/80). When freshly made, i.e., less than one week old, the wet adhesion to anodized aluminum was improved over a conventional acrylic latex sealant containing no silane. However longer storage time of this sealant formulation in packaged form causes the adhesion to become poorer on substrates, even in a dry environment.

Control C is also a conventional acrylic latex based sealant formulation modified with unhydrolyzed bis(N,N'-gamma-propyltrimethoxysilyl)ethylene diamine. Its behavior was similar to that of Control B.

Examples 1 and 2 are conventional acrylic latex sealant formulations modified by the addition of 1.25 and 1.5 weight % respectively of hydrolyzed gamma-aminopropyltriethoxy silane, 10% by weight of a solution of a vinyl chloride/vinyl acetate copolymer in dibutyl phthalate and 0.4 and 0.5 weight % respectively of 28% ammonium hydroxide to raise the pH from approximately 7.5 to approximately 8.5. The ammonium hydroxide and hydrolyzed gamma-aminopropyltriethoxy silane were pre-mixed and then blended into the acrylic latex before the other components of the formulation were added. The inclusion of the ammonium hydroxide effects better adhesion and improved aging stability of the latex sealant formulation.

Both Examples 1 and 2 afford sealants which maintain adhesion to and remain dimensionally unchanged on various metal and siliceous substrates after 4 hours under the simulated rain test.

Control D which incorporates hydrolyzed gamma-aminopropyltriethoxysilane into an acrylic latex sealant formulation together with a butyl benzyl phthalate solution of a vinyl chloride/vinyl acetate copolymer does not include ammonium hydroxide to control the pH. The resultant product shows a marked improvement over Control A in wet adhesion on aluminum and anodized aluminum substrates. However, it failed wet adhesion tests on the glass substrate.

EXAMPLES 3-7

When Example 1 was repeated with the exception that the vinyl chloride/vinyl acetate copolymer was replaced by other hydrophobic resins, viz., vinyl chloride/vinyl acetate/maleic acid terpolymers, vinyl chloride/vinyl acetate/vinyl alcohol terpolymers, polystyrene, thermoplastic polyhydroxyether resin and ethyl acrylate/methyl methacrylate copolymers, sealants having comparable water resistant and wet adhesion properties were obtained.

Aluminum, anodized aluminum and glass panels were coated with Control A and Example 2 prepared and aged for two weeks at room temperature. The panels were then immersed in water for one week after which the coatings were subjected to a wet peel adhesion test. This test is described in Federal TT-S-00230C adhesion in peel 4.3.10. The peel strengths of three panels coated with Control A, B or C were 0. In contrast the coatings from Example 2 afforded wet peel strengths of 10.4, 11.7 and 14.6 lbs/inch respectively on aluminum, anodized aluminum and glass panels.

The superiority of Examples 1 and 2 which describe sealants containing hydrolyzed aminosilanes and hydrophobic resins compounded with plasticizer into acrylic latices was further demonstrated over the Controls by meeting the requirements of 4.3.9 the Durability of bond-cohesion Federal Specification TT-S-00230C for Type II - non-sag Class B compounds resistant to 25% total joint movement. When tested as prescribed in Section 4.3.9 with standard glass, aluminum and cement substrates, the total loss in bond area and cohesion area and/or equivalent amount of sealant deformation among the three specimens shall be no more than 1.5 inches for the failed samples.

The simulated rain test consists of positioning the glass panel 11 inches below and at a 45° angle from the perpendicular under a straight line series of five streams of water which strike ½ to 1 inch above the sealant and continuously flow over the sample until the sample fails or the sample has undergone 4 hours of continuous washing without disintegrating.

water immersion tests are run by placing sealant coated substrates directly into containers of room temperature water. The samples are kept continually immersed for whatever period of time is required for the sample to fail, or for at least 40 days which is indicative of complete water resistance.

Although the invention has been described in its preferred forms with a certain degree of particularity, it is understood that the present disclosure of the preferred forms has been made only by way of example and that numerous changes may be made without departing from the spirit of the scope of the invention.

What is claimed is:

1. In an acrylic resin latex based sealant composition, the improvement which comprises introducing about 0.1 to about 10 weight % of an hydrophobic resin dissolved in about 2 to about 20 weight % of a liquid organic, non-coagulating, non-gelling solvent into said acrylic resin latex together with an aqueous solution of about 0.5 to about 5.0 weight % of an hydrolyzed organoaminosilane containing sufficient base to maintain a pH of at least 8.5, with the proviso that the total weight of the components including the acrylic latex equals 100%.

2. Composition claimed in claim 1 wherein the organoaminosilane is represented by the graphic formula:

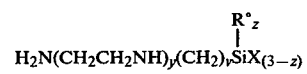

wherein
R° is selected from the group consisting of alkyl having about 1–4 carbons, aryl having about 6–10 carbons and alkaryl groups having about 7–10 carbons,
y=0 or 1;
v is an integer having values of 1 to 6;
z is an integer having values of from 0 to 2 inclusive; and
X=alkoxy radicals having 1–6 carbons.

3. Composition claimed in claim 1 wherein the hydrophobic resin is a vinyl resin.

4. Composition claimed in claim 3 wherein the vinyl resin is a vinyl chloride-vinyl acetate copolymer.

5. Composition claimed in claim 3 wherein the vinyl resin is a vinyl chloride-vinyl acetate-vinyl alcohol terpolymer.

6. Composition claimed in claim 3 wherein the vinyl resin is a vinyl chloride-vinyl acetate-maleic acid terpolymer.

7. Composition claimed in claim 1 wherein the hydrophobic resin is a water-insoluble alkyl acrylate and/or methacrylate copolymer.

8. Composition claimed in claim 3 wherein the vinyl resin is polystyrene.

9. Composition claimed in claim 1 wherein the hydrophobic resin is a phenoxy resin derived from 2,2-bis(p-hydroxyphenyl)propane and epichlorohydrin.

10. Composition claimed in claim 1 wherein the organoaminosilane is gamma-aminopropyltrimethoxysilane.

11. Composition claimed in claim 1 wherein the organoaminosilane is gamma-aminopropylmethyldiethoxysilane.

12. Composition claimed in claim 1 wherein the organoaminosilane is delta-aminobutylmethyldiethoxysilane.

13. Composition claimed in claim 1 wherein the organic solvent is dibutyl phthalate.

14. Composition claimed in claim 1 wherein the acrylic resin latex is a copolymer of ethyl acrylate containing minor amounts of acrylic acid, acrylonitrile and n-methylolacrylamide.

* * * * *